(12) United States Patent
Straeter

(10) Patent No.: US 9,408,341 B2
(45) Date of Patent: Aug. 9, 2016

(54) SEED VARIETY CHANGER FOR A PLANTER

(71) Applicant: James Straeter, Rochester, IN (US)

(72) Inventor: James Straeter, Rochester, IN (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days.

(21) Appl. No.: 14/836,464

(22) Filed: Aug. 26, 2015

(65) Prior Publication Data

US 2015/0359166 A1 Dec. 17, 2015

Related U.S. Application Data

(63) Continuation of application No. 13/934,647, filed on Jul. 3, 2013, now Pat. No. 9,148,992, which is a continuation-in-part of application No. 12/688,935, filed on Jan. 18, 2010, now Pat. No. 8,543,238.

(51) Int. Cl.
*G06F 7/00* (2006.01)
*A01C 7/12* (2006.01)
*A01C 7/20* (2006.01)
*A01C 7/08* (2006.01)
*A01C 7/10* (2006.01)
*A01C 21/00* (2006.01)
*A01C 7/16* (2006.01)

(52) U.S. Cl.
CPC . *A01C 7/12* (2013.01); *A01C 7/081* (2013.01); *A01C 7/082* (2013.01); *A01C 7/10* (2013.01); *A01C 7/121* (2013.01); *A01C 7/127* (2013.01); *A01C 7/16* (2013.01); *A01C 7/20* (2013.01); *A01C 21/005* (2013.01)

(58) Field of Classification Search
CPC combination set(s) only.
See application file for complete search history.

(56) References Cited

U.S. PATENT DOCUMENTS

| | | | |
|---|---|---|---|
| 5,938,071 A | 8/1999 | Sauder | |
| 6,595,148 B2 | 7/2003 | Meyer et al. | |
| 7,086,269 B2 * | 8/2006 | Sauder | A01C 7/107 73/1.01 |
| 2003/0167986 A1 * | 9/2003 | Sauder | A01C 7/04 111/170 |
| 2004/0079264 A1 * | 4/2004 | Mayerle | A01C 7/20 111/174 |

* cited by examiner

*Primary Examiner* — Yolanda Cumbess
(74) *Attorney, Agent, or Firm* — McKee, Voorhees & Sease, PLC

(57) ABSTRACT

A system for changing seed variety on a planter includes a plurality of row units with each row unit having a plurality of seed meters. Each seed meter has a guide for delivering seed to a transport belt and a switch that is activated and deactivated by a switch actuator on the belt. The belt has adjustable sidewalls, cover, and lugs.

20 Claims, 4 Drawing Sheets

SEED VARIETY CHANGER FOR A PLANTER

CROSS-REFERENCE TO RELATED APPLICATIONS

This application is a Continuation Application of U.S. Ser. No. 13/934,647, filed Jul. 3, 2013, which is a Continuation-in-Part Application of U.S. Ser. No. 12/688,935, filed Jan. 18, 2010, now U.S. Pat. No. 8,543,238, issued Sep. 24, 2013, the contents of which are all hereby incorporated by reference in their entirety.

BACKGROUND OF THE INVENTION

This invention is directed to a method and apparatus for changing the seed type on a planter and more particularly to a method and apparatus that improves the ease and precision of changing seed types on a planter.

Devices for changing the seed type on a planter are known in the art. Existing devices have raised the complexity of an operation that is critical to a farm's income. As a result of the complexity, farmers have been less likely to change seed varieties when planting, thus compromising yield opportunities for speed. Most fields have a majority of land that utilizes one variety of seed and other minor areas that require a different seed. In order to encourage farmers to take advantage of the opportunity to increase yield and profits, a device is needed that reduces costs, complexity, and operational hurdles. In addition, with current devices, locating and holding a seed for precise delivery to the ground as the seed, once it leaves a metering device, tends to bounce and/or scatter. Thus, a device that addresses this deficiency is also needed.

Finally, most current devices require the use of GPS to control activation of the meters. Yet in some areas, such as Eastern Europe, GPS technology is not so readily available. Thus, a device that addresses this deficiency is needed in the art.

An objective of the present invention is to provide a device that changes seed variety in a planter in a simple and easy way.

A further objective of the present invention is to provide a device that controls and holds a seed when changing the variety of seed during planting.

A still further objective of the present invention is to provide a device that triggers the change of seed variety during planting without the use of GPS.

These and other objectives will be apparent to one of ordinary skill in the art based upon the following written description, drawings and claims.

SUMMARY OF THE INVENTION

A system for changing seed variety in a planter includes a plurality of row units with each row unit having a plurality of seed meters, Each seed meter is connected to and in communication with a hopper with each hopper contained a different variety of seed.

Positioned below the seed meters is a transport belt that receives seeds from the meters and transports the seeds to a seed tube for planting. In one embodiment a guide is attached to the discharge end of each seed meter to reduce bounce of the seed when received on the belt. Further, to control the position of the seed on the belt, the belt has adjustable lugs, sidewalls, and/or a cover.

To easily switch from one seed variety to another, each seed meter has a switch that is selectively activated and deactivated by a switch actuator that is attached to the belt. Also, the system has a clean out system that uses an existing seed delivery fan to create a vacuum that removes seeds from the belt for storage. Also, a seed carrying system using a bulk seed delivery system such as a Kinze Air Seed Delivery system for a large reservoir of a primary hybrid and one or more 'seed boxes' used on a row unit is described. In this manner a farmer can carry a large amount of seed and multiple varieties as desired without the complexity of multiple bulk delivery system.

DETAILED DESCRIPTION OF THE PREFERRED EMBODIMENTS

Figure 1:
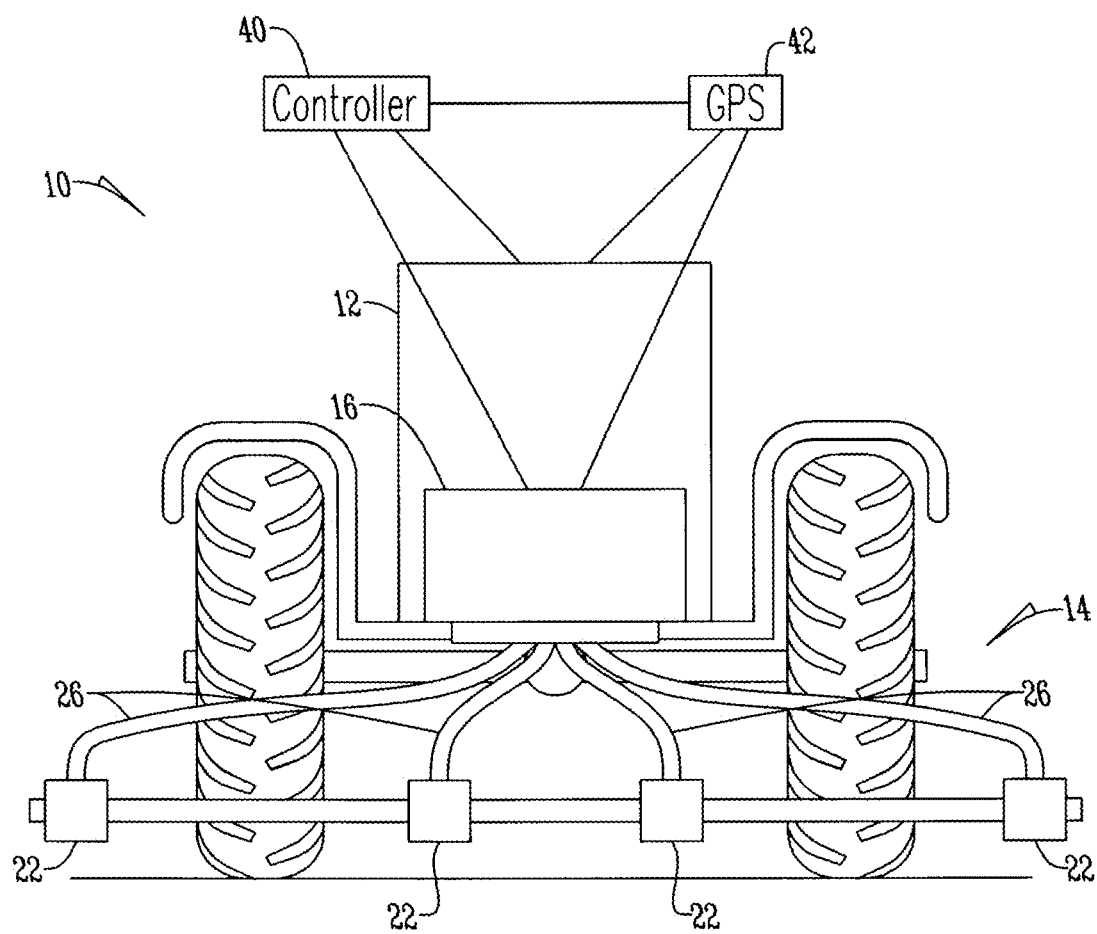
FIG. 1 is an end view of a system for changing seed variety for a planter.
Figure 2:
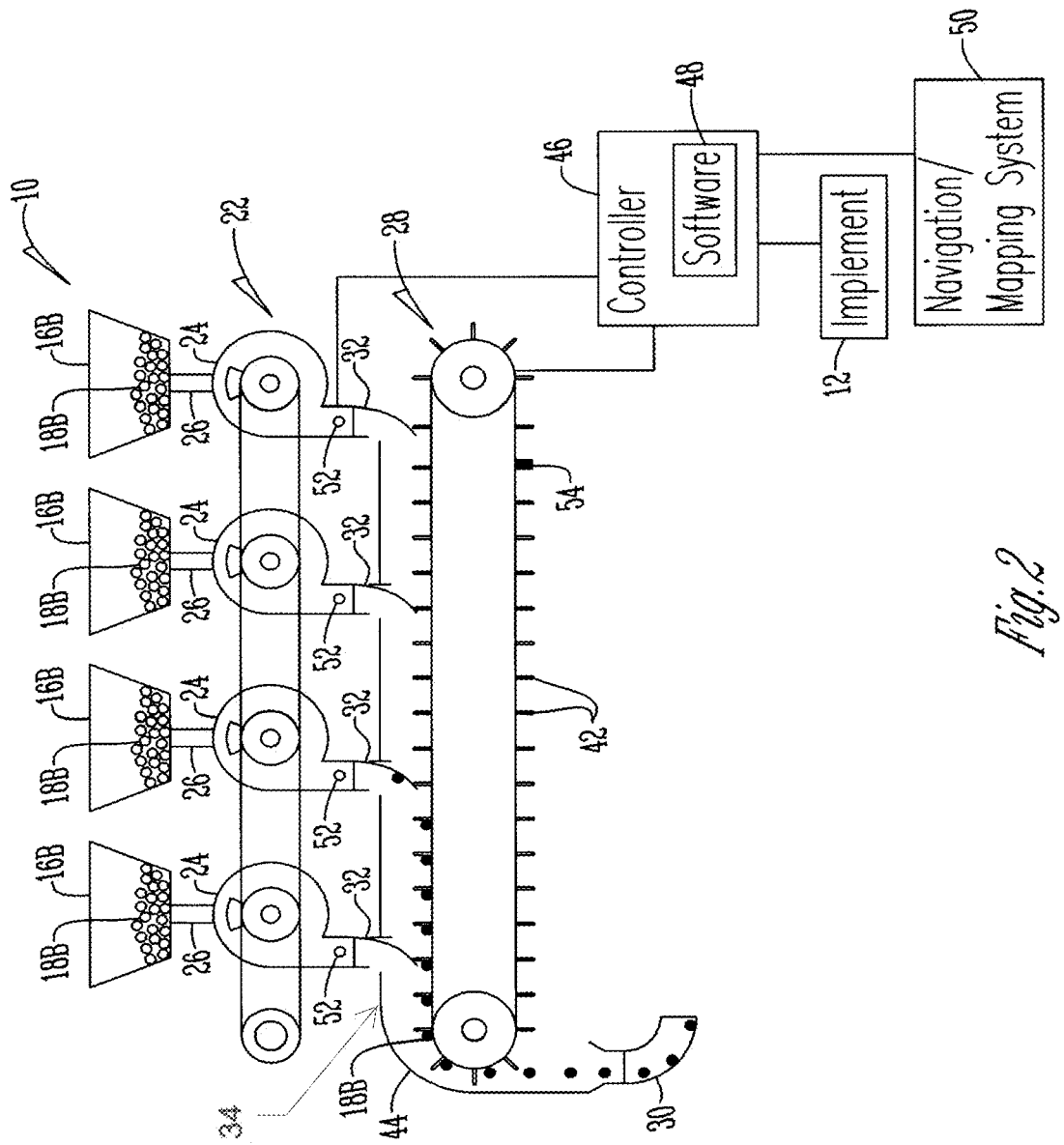
FIG. 2 is a side view of a planting system.
Figure 3:
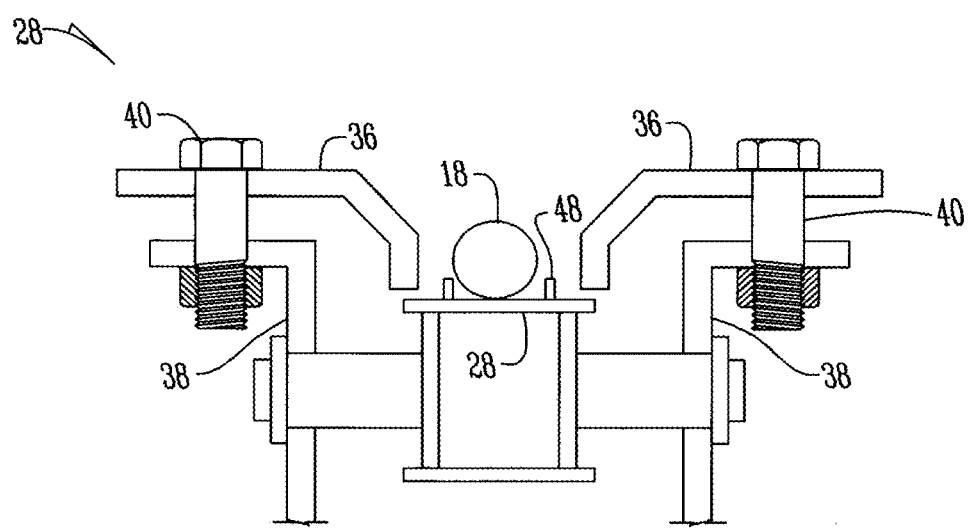
FIG. 3 is an end view of transport belt.
Figure 4:
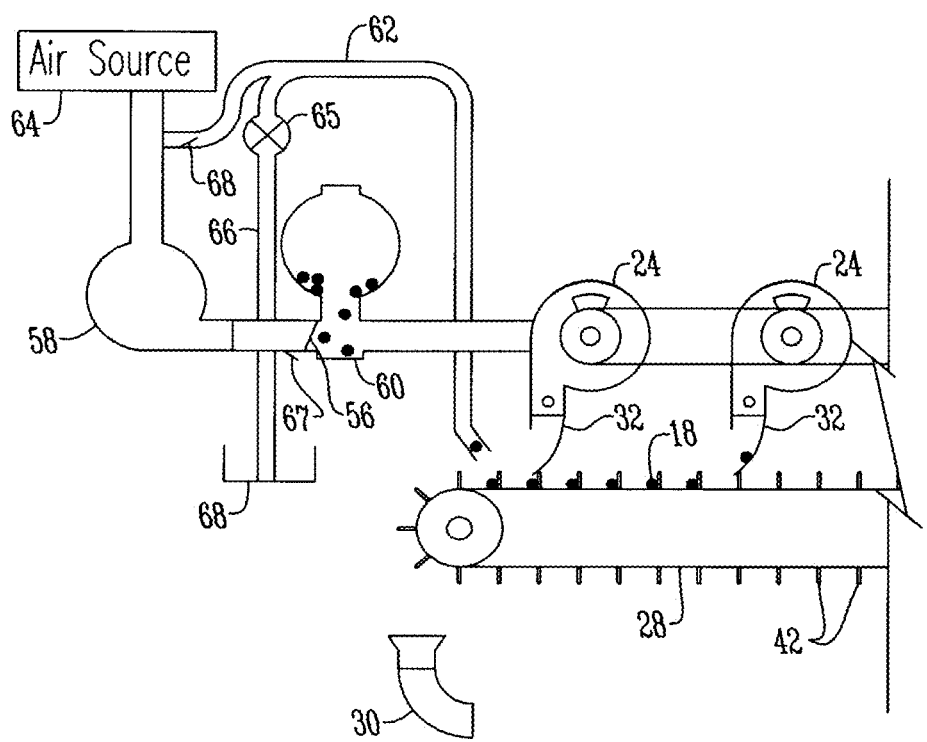
FIG. 4 is a clean out system for a planter.

Referring to the Figures, a planting system 10 includes an agricultural implement 12 that pulls a planter 14. The planter includes a plurality of hoppers, tanks, and/or boxes 16 that hold different varieties of seeds 18. In one embodiment the planter 14 has a bulk hopper 16A that holds a main seed variety 18A and a plurality of boxes 16B that hold different types of secondary seeds 18B for use with unique ground areas.

The planter also has a plurality of row units 22 with each row unit 22 having a plurality of seed meters 24. The seed meters 24 may be arranged in any manner such as stacked generally on top of one another, in-line with one another or in any other type of configuration. Each seed meter 24 is connected to and in communication with a respective hopper 16 by a tube, hose, or the like 26 such that seed 18 is delivered from the hopper 16 to the meter 24.

Positioned below the discharge of the seed meters 24 is a transport belt 28. The transport belt 28 receives seed 18 from the seed meters 24 and delivers seed 18 to a seed tube 30 preferably positioned at one end of the belt 28. The seed tube 30 delivers seed to be deposited in the ground for planting.

To reduce the bounce of the seed 18 onto the belt 28, a guide 32 is attached to the discharge of the seed meter 24 and positioned above and near the belt 28. The guide 32 is of any shape such as angled, arcuate, or the like and preferably delivers seed 18 in the direction that the belt 28 is moving. Also, preferred is that the guide 32 be adjustable in relation to the belt 28 to accommodate for different planting needs.

To further locate and hold the seed 18 on belt 28, a cover 34 is attached to adjustable sidewalls 36 of the belt 28 which are connected to a belt frame 38 by bolts 40. The belt 28 also has a plurality of lugs or flights 42 that also may be adjustable or can be changed by switching the belt to a belt with a different lug design. At the discharge end of the belt 28, the cover has an end guide 44 that assists in controlling seed drop to the seed tube 30. The cover 34, lugs 42, and sidewalls 36 are all adjusted such that a seed 18 fits comfortably on the belt 28 below the cover 34 and between the lugs 42 so as to hold the seed 18 between the lugs 42. The sidewalls 36 adjust to accommodate different belt widths for different seed types. For example, different belts would be used for wheat or milo as opposed to corn and beans. With these provisions, belt 28 effectively becomes a seed meter.

The transport belt 28 and seed meters 24 are connected to and controlled by a controller 46 having software 48 that actuates and coordinates the operation of the seed meters 24 and the transport belt 28. In one embodiment, the controller 46 is in electronic communication with instrumentality of the implement 12 and a GPS/satellite navigation and mapping system 50, which is in electronic communication with the implement 12 and planter 14.

For use when GPS is not available, each seed meter 24 has a switch or sensor 52 located adjacent the transport belt 28. Attached to the belt 28 and connected to the controller 46 is a switch actuator 54. In one embodiment the switch actuator 54 is an electrically charged magnet. The switch actuator 54 is activated by the controller based upon manual actuation by an operator. For example, in an arrangement having four seed meters 24, when the rear seed meter is dispensing seed 18 to belt 28, and it is desirable to change to the front seed meter, an operator pushes a button, flips a switch, or pulls a lever which sends a signal to the controller 46 to activate the front meter and deactivates the rear meter. The controller 46 then sends signals to the switch actuator 54 such that as the actuator 54 passes by the rear meter switch 52, the rear meter 24 is deactivated and stops depositing seeds 18 to belt 28. As the actuator 54 passes the front meter switch 52, the front meter switch 52 is activated and the front meter 24 begins depositing seeds 18 to the belt 28 at exactly the point that the end of the seed supply on the belt passes under meter 1. As a result, there is no interruption in delivering seeds 18 to the belt 28 nor are multiple seeds 18 delivered into a lug 42 on the belt 28.

When planting is completed and an operator wishes to clean out the seeds 18 from the planter 14, the operator closes the gate valve 56 between the fan 58, used for delivery of hulk seed to a seed meter 24 and an entrainment box 60 and opens gate valve 67 to provide an air exit. A conduit 62 is connected between an air source 64 and the fan 58 and the discharge end of the transport belt 28 and is connected to the fan intake via gate valve 68, which is opened when seed clean out is desired. Utilizing an airlock 65 connected to conduit 62 and exit conduit 66 which leads to a storage or transport container vehicle 69, a vacuum is created. Thus, by running each seed meter 24 separately for each seed 18 type, the seeds 18 are delivered via the air lock 64 to a vacuum conduit 62 using air pressure from the fan 58 to the exit conduit 66 which delivers the seed to storage 69. If desired, gate valve 56 can be re-opened and valve 67 closed such that a meter 24 is refilled until the bulk seed hopper is empty.

Thus a device for changing the variety of seed for a planter has been disclosed that at the very least meets all the stated objectives.

What is claimed is:

1. A system for changing the seed variety planted, comprising;
    a planter including a plurality of row units each including a plurality of seed meters; and
    a single belt associated with the meters such that the belt receives seed from each of the plurality of meters and transports the seed to a furrow for planting in a field;
    said single belt including a plurality of flights and including a portion that extends below the plurality of meters.

2. The system of claim 1, further comprising a controller to actuate the operation of the plurality of seed meters.

3. The system of claim 2, further comprising a mapping system operatively connected to the controller to selectively operate the plurality of seed meters to change the variety of seed planted.

4. The system of claim 3, wherein the mapping system comprises a global positioning system.

5. The system of claim 1, further comprising a guide positioned between a seed meter and the belt.

6. The system of claim 5, wherein the guide is configured to deliver the seed from the seed meter to the belt.

7. The system of claim 1, further comprising an adjustable cover associated with the belt.

8. The system of claim 7, wherein the cover terminates in an end guide at a discharge end of the belt.

9. The system of claim 8, wherein the cover encloses the seed between the plurality of flights and the cover.

10. A row unit of an agricultural planter capable of changing the seed variety planted at the row unit, the row unit comprising:
    a plurality of seed meters positioned on the row unit of the planter; and
    a single belt associated with the meters such that the belt receives seed from each of the plurality of meters and transports the seed to a furrow;
    said single belt including a plurality of flights and including a portion that extends below the plurality of meters;
    wherein said meters positioned at least partially forward and aft of one another on the row unit relative to a direction of travel of the planter.

11. The row unit of claim 10, further comprising at least one seed meter housing.

12. The row unit of claim 11, further comprising a guide positioned between a seed meter housing and the belt.

13. The system of claim 12, wherein the guide is configured to deliver the seed from the seed meter to the belt.

14. The system of claim 10, further comprising a controller to actuate the operation of the plurality of seed meters.

15. The system of claim 14, further comprising a mapping system operatively connected to the controller to selectively operate the plurality of seed meters to change the variety of seed planted.

16. The system of claim 10, further comprising a cover terminating in an end guide at a discharge end of the belt.

17. A system for changing the seed variety planted by a planter, comprising:
    a plurality of row units each including a plurality of seed meters, said row units operatively connected to the planter;
    a single belt associated with the meters such that the belt receives seed from each of the plurality of meters and transports the seed to a furrow;
    said single belt including a plurality of tights and including a portion that extends below the plurality of meters; and
    a seed delivery system for delivering seed from a plurality of hoppers to the plurality of seed meters;
    wherein said meters positioned at least partially forward and aft of one another on the row unit relative to a direction of travel of the planter.

18. The system of claim 17, wherein the seed delivery system comprising a seed delivery conduit connected to a fan, a gate valve, a bulk seed hopper, an entrainment box, and one of the plurality of seed meters.

19. The system of claim 18, wherein the seed delivery system further comprising a vacuum pressure conduit connected to an air supply conduit between the fan and an air supply at one end and a discharge end of the belt at an opposite end.

20. The system of claim 17, wherein said single belt being operated by controller.

* * * * *